US010330163B2

(12) United States Patent
French et al.

(10) Patent No.: US 10,330,163 B2
(45) Date of Patent: Jun. 25, 2019

(54) SHIELD ATTACHMENT METHOD AND DEVICE

(71) Applicant: GOODRICH CORPORATION, Charlotte, NC (US)

(72) Inventors: Robert French, Beavercreek, OH (US); Paul J. Howard, Riverside, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 21 days.

(21) Appl. No.: 15/784,570

(22) Filed: Oct. 16, 2017

(65) Prior Publication Data

US 2019/0113092 A1 Apr. 18, 2019

(51) Int. Cl.
*B64C 25/34* (2006.01)
*F16D 65/847* (2006.01)
*B64C 25/42* (2006.01)
*F16D 65/78* (2006.01)

(52) U.S. Cl.
CPC ............ *F16D 65/847* (2013.01); *B64C 25/34* (2013.01); *B64C 25/42* (2013.01); *F16D 2065/785* (2013.01)

(58) Field of Classification Search
CPC ...... F01D 25/08; F01D 25/14; F05D 2240/81; F02C 7/16; F04D 29/58; F23R 2900/03044; F23R 3/002; F16D 2065/785; F16D 65/847; F16D 2069/006; F16D 65/78; F16D 65/827; B64C 25/42; B64C 25/34
USPC ....................................... 188/264 G; 415/178
See application file for complete search history.

(56) References Cited

U.S. PATENT DOCUMENTS

| 3,061,050 | A | * | 10/1962 | Van Horn | B60T 1/065 188/18 A |
| 3,829,162 | A | * | 8/1974 | Stimson | B60T 1/065 192/113.4 |
| 3,958,833 | A | * | 5/1976 | Stanton | F16D 55/40 301/6.2 |
| 5,002,342 | A | * | 3/1991 | Dyko | B60C 23/18 188/264 G |
| 6,003,954 | A | | 12/1999 | Everhard et al. | |
| 8,668,276 | B2 | * | 3/2014 | Hall | B64C 25/36 301/6.1 |
| 2006/0219860 | A1 | * | 10/2006 | Greenwood | B60R 13/0869 248/560 |
| 2013/0015697 | A1 | * | 1/2013 | Hall | B64C 25/36 301/6.91 |
| 2017/0059167 | A1 | * | 3/2017 | Bloom | F23R 3/60 |
| 2017/0106973 | A1 | * | 4/2017 | Baden | B64C 25/36 |

FOREIGN PATENT DOCUMENTS

EP 1548246 A2 * 6/2005 ............. F01N 13/14

* cited by examiner

Primary Examiner — Bradley T King
Assistant Examiner — Mahbubur Rashid
(74) Attorney, Agent, or Firm — Snell & Wilmer, L.L.P.

(57) ABSTRACT

A heat shield assembly for a braking system is provided. The heat shield assembly includes a circumferential heat shield having a first end and a second end spaced from the first end along a central axis. A tab member is disposed proximate the second end of the circumferential heat shield. The tab member has a radially extending portion with an aperture extending therethrough. The aperture is configured for mounting the circumferential heat shield to a wheel.

4 Claims, 9 Drawing Sheets

SHIELD ATTACHMENT METHOD AND DEVICE

FIELD

The present disclosure relates to aircraft wheel and brake assemblies and, more particularly, to heat shields and heat shield support structures used in aircraft wheel and brake assemblies.

BACKGROUND

Aircraft typically utilize brake systems on wheels to slow or stop the aircraft during landings, taxiing and rejected takeoffs. The brake systems generally employ a brake stack comprising a series of friction disks that may be forced into sliding contact with one another during brake actuation to slow or stop the aircraft. Under various conditions, brake actuation may generate high temperatures in the vicinity of the brake stack that can adversely impact or damage wheels or tires mounted thereon. A heat shield positioned between the brake stack and the wheel can mitigate thermal damage.

SUMMARY

A heat shield assembly is disclosed. The heat shield includes a circumferential heat shield having a first end and a second end spaced from the first end along a central axis and a tab member disposed proximate the second end of the circumferential heat shield. The tab member may have a radially inward extending portion with an aperture extending therethrough and be configured for mounting the circumferential heat shield to a wheel.

In various embodiments, the tab member includes an axially extending first portion connected to the second end of the circumferential heat shield, and the radially inward extending portion is a second portion extending radially inward from the first portion toward the central axis. The first portion of the tab member may be formed integrally with the second end of the circumferential heat shield. The first portion of the tab member may, alternatively, be connected to the second end of the circumferential heat shield by a weld or by a fastener. In various embodiments, the second portion of the tab member comprises a single strip of material extending radially inward toward the central axis.

In various embodiments, the tab member may comprise a plurality of arms forming the first portion and the second portion, the first portion including a first end of each arm connected to the connection member and a second end of each arm terminating proximate the aperture. In various embodiments, the first portion of the tab member includes a connection member and the tab member includes a plurality of arms forming the first portion and the second portion, the first portion including a first end of each arm connected to the connection member and the second portion including a second end of each arm terminating proximate the aperture. The connection member may comprise a single portion of material connected to the circumferential heat shield or a plurality of material portions connected to the circumferential heat shield. In various embodiments, the first arm and the second arm are non-integral, and the second end of each arm includes an individual aperture that centrally aligns to form the aperture of the tab member. In various embodiments, the connection portion is formed integrally with the second end of the circumferential heat shield.

In various embodiments, a heat shield assembly includes a circumferential heat shield having a first end and a second end spaced from the first end along a central axis and a tab member disposed proximate the second end of the circumferential heat shield. The tab member may include an axially extending first portion connected to the second end of the circumferential heat shield and a second portion extending radially from the circumferential heat shield. The second portion may have an aperture extending therethrough and configured for mounting the circumferential heat shield to a wheel. In various embodiments, the assembly may include a torque bar having a first end configured for mounting to the wheel proximate a rim portion of the wheel and a second end having a pin configured for insertion through the aperture and into a hole disposed proximate a web portion of the wheel. The hole can be circular or other shapes, such as polygonal.

In various embodiments, the circumferential heat shield includes a plurality of heat shield sections and a plurality of tab members, each of the heat shield sections including at least one of the tab members connected to the heat shield section. In various embodiments, the second portion of the at least one tab member comprises a single strip of material extending radially inward toward the central axis. In various embodiments, the at least one tab member comprises a plurality of arms forming the first portion and the second portion, the first portion including a first end of each arm connected to the heat shield sections, and the second portion including a second end of each arm terminating proximate the aperture. In various embodiments, the first portion of the at least one tab member comprises a connection member and the at least one tab member comprises a plurality of arms forming the first portion and the second portion, with the first portion including a first end of each arm connected to the connection member and the second portion including a second end of each arm terminating proximate the aperture. In various embodiments, the connection member comprises a single portion of material connected to the heat shield section. In various embodiments, the first arm and the second arm are non-integral, and the second end of each arm includes an individual aperture that centrally aligns to form the aperture of the tab member, and the connection member may be formed integrally with the second end of the circumferential heat shield.

In various embodiments, a heat shield assembly includes a circumferential heat shield having a first end and a second end spaced from the first end along a central axis and a plurality of tab members disposed proximate the second end of the circumferential heat shield. Each tab member may include a first portion connected to the second end of the circumferential heat shield and a second portion extending radially from the circumferential heat shield, the second portion having an aperture extending therethrough and being configured for mounting the circumferential heat shield to a wheel. In various embodiments, each tab member may further include a grommet disposed within the aperture. The assembly may further include a plurality of torque bars, each torque bar having a first end configured for mounting to the wheel proximate a rim portion of the wheel and a second end having a pin configured for insertion through the aperture and grommet and into a hole disposed proximate a web portion of the wheel. The hole can be circular or other shapes, such as polygonal.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
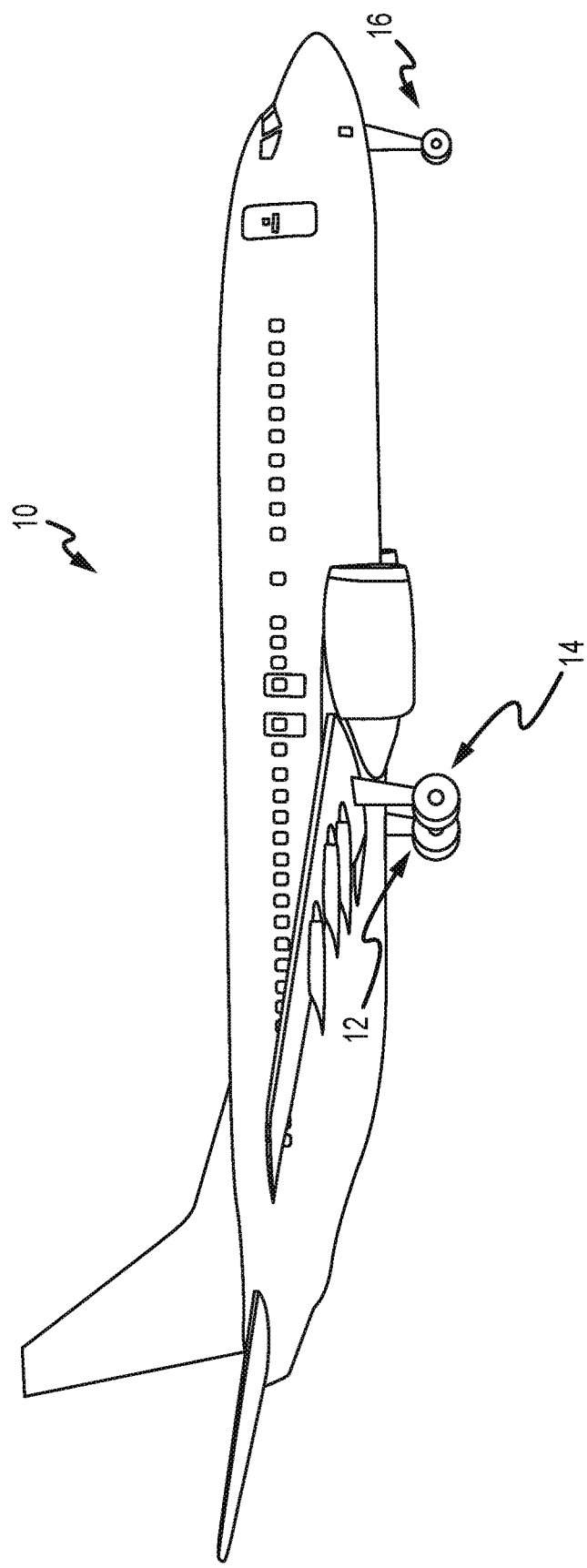
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage.

Figure 1B:
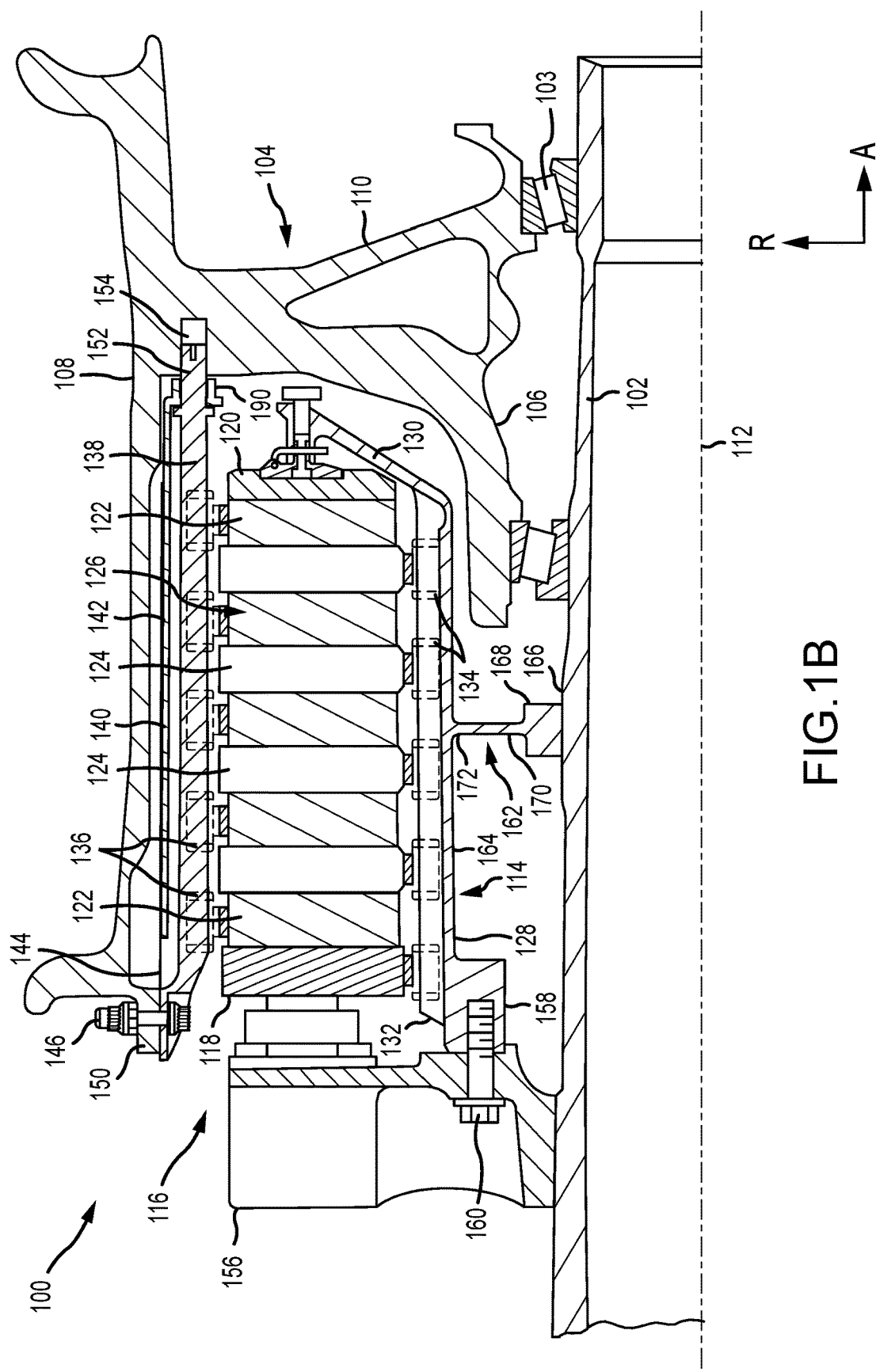
FIG. 1B illustrates a cross-sectional view of a brake assembly, in accordance with various embodiments.

Referring now to FIG. 1B, there is schematically depicted a brake mechanism 100 mounted on an axle 102 for use with a wheel 104 disposed on and configured to rotate about the axle 102 via one or more bearing assemblies 103. The wheel 104 includes a hub 106, a wheel well 108 concentric about the hub 106 and a web 110 interconnecting the hub 106 and the wheel well 108. An central axis 112 extends through the axle 102 and defines a center of rotation of the wheel 104. A torque plate barrel 114 (sometimes referred to collectively as a torque tube or barrel and a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of interleaved rotor disks 122 and stator disks 124 positioned intermediate the pressure plate 118 and the end plate 120. The pressure plate 118, interleaved rotor disks 122 and stator disks 124 and the end plate 120 together form a brake heat sink or brake stack 126. The pressure plate 118, the end plate 120 and the stator disks 124 are mounted to the torque plate barrel 114 and prevented from rotating relative to the axle 102.

The torque plate barrel 114 may include an annular barrel or torque tube 128 and an annular plate or back leg 130. The back leg 130 is disposed at an end distal from the piston assembly 116 and may be made integral with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The stator disks 124 and pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the stator disks 124 and the pressure plate 118 during a braking action. The rotor disks 122, interleaved between the pressure plate 118, the end plate 120 and the stator disks 124, each have a plurality of circumferentially spaced notches or rotor lugs 136 along an outer periphery of each disk for engagement with corresponding torque bars 138 that are secured to or made integral with an inner periphery of the wheel 104.

An actuating mechanism for the brake mechanism 100 includes a plurality of piston assemblies 116 circumferentially spaced around an annular piston housing 156 (only one piston assembly 116 is illustrated in FIG. 1B). Upon actuation, the piston assemblies 116 effect a braking action by urging the pressure plate 118 and the stator disks 124 into frictional engagement with the rotor disks 122 and against the end plate 120. Fluid or hydraulic pressure, mechanical springs or electric actuators, among other mechanisms, may be used to actuate the piston assemblies 116. Through compression of the interleaved rotor disks 122 and stator disks 124 between the pressure plate 118 and the end plate 120, the resulting frictional contact slows or stops or otherwise prevents rotation of the wheel 104. The rotor disks 122 and the stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the stationary axle 102. The pedestal 162 may be made integral with the torque tube 128 portion of the torque plate barrel 114.

A heat shield 140 is secured directly or indirectly to the wheel 104 between a radially inward surface of the wheel well 108 and the torque bars 138. As illustrated in FIG. 1B, the heat shield 140 is concentric with the wheel well 108 and may have a plurality of heat shield sections 142 disposed between respective, adjacent pairs of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the torque bars 138 and the radially inward surface of the wheel well 108. In various embodiments, including for heavy-duty applications, the heat shield 140, or heat shield sections 142, may be further secured in place by heat shield carriers 144.

The torque bars 138 are attached at their axially inboard end to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each torque bar 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190, as discussed in more detail below.

Figure 2A:
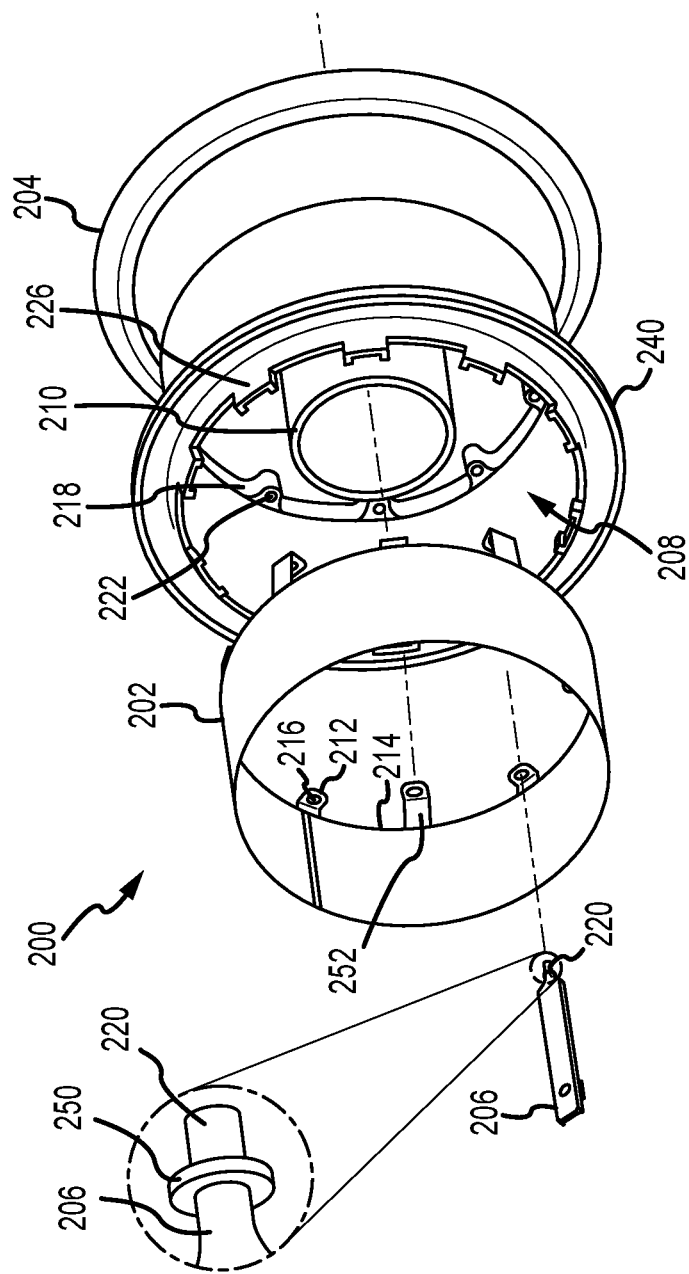
FIG. 2A illustrates an exploded view of a heat shield and mounting assembly, in accordance with various embodiments.
Figure 2B:
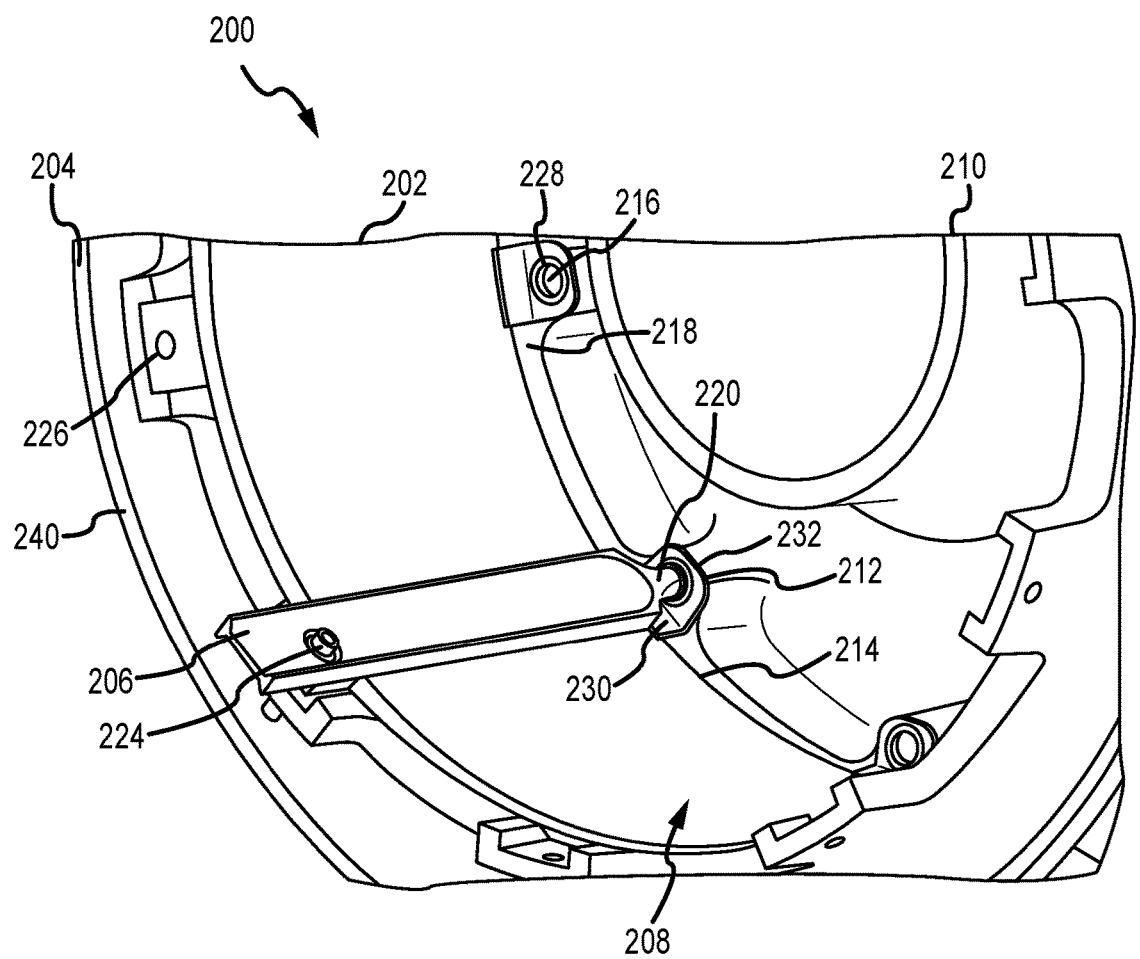
FIG. 2B illustrates an assembled view of a heat shield and mounting assembly, in accordance with various embodiments.

Referring now to FIGS. 2A and 2B, exploded and assembled views of a wheel assembly 200 are illustrated in accordance with various embodiments. The wheel assembly 200 includes a heat shield 202 configured for mounting to a wheel 204. A plurality of torque bars 206 is used to mount the heat shield 202 to the wheel 204. As described above, the heat shield 202 is generally concentric within a wheel well 208 and about a wheel hub 210 and configured to be spaced from the surface of the wheel well 208. In various embodiments, the heat shield 202 includes a plurality of tab members 212 disposed on the heat shield 202 proximate an outboard portion or second end 214 of the heat shield 202. The tab members 212 generally include an aperture 216 extending through the tab member in an axial direction and positioned for mounting the heat shield 202 to a web portion 218 of the wheel 204. In various embodiments, the plurality of tab members 212 may include tab members that are staggered in the axial direction—e.g., the plurality of tab members 212 may include second tab members 252 that are offset a distance axially (either forward or reverse) to provide a staggered series of tab members.

The torque bars 206 may include a pin 220 or similar member configured for insertion through respective apertures 216 and into a hole 222 disposed proximate the web portion 218 of the wheel 204. The torque bars 206 may further include a ring member 250 (or similar feature) to more robustly secure the tab members 212 against the web portion 218. The torque bars 206 are secured to an inboard end of the wheel 204 by torque bar bolts 224 that may thread into flanges 226 (or be secured with nuts) positioned at the inboard end of the wheel 204 proximate a rim portion 240 of the wheel 204. The torque bars 206 may be used to secure the heat shield 202 in position between the torque bars 206 and the inner surface of the wheel well 208. In various embodiments, a grommet 228 is positioned about or within each aperture 216 to provide a separation between each tab member 212 and each pin 220. The grommet may provide protection from abrasion, vibration and dielectric currents. In various embodiments, the tab member 212 is generally L-shaped, with a first portion 230 connected to the heat shield 202 and a second portion 232 extending radially inward toward a central axis of the wheel, such as the central axis 112 referred to in FIG. 1B. In various embodiments, the first portion 230 and the second portion 232 of the tab member 212 comprise a single strip of material. In various embodiments, the second portion 232 of the tab member 212 comprises a single strip of material extending radially inward from the first portion 230 of the tab member 212. In various embodiments, as described further below, the tab members 212 and the heat shield 202 are comprised of a single piece of material.

Figure 3A:
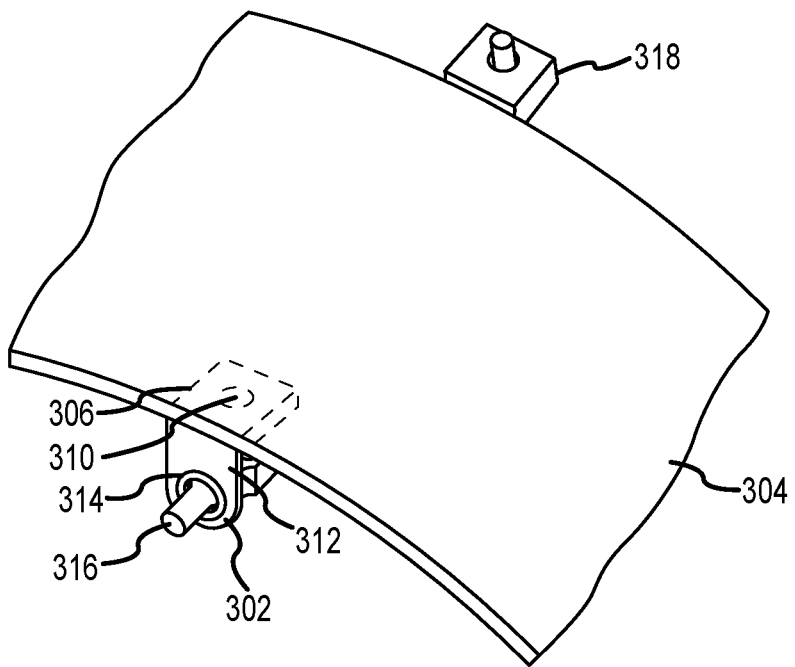
FIGS. 3A and 3B illustrate heat shield and mounting assemblies, in accordance with various embodiments.

Referring now to FIG. 3A, a tab member 302 is illustrated connected to a portion of a circumferential heat shield 304. In various embodiments, a first portion 306 of the tab member 302 may be formed integrally with the heat shield 304. In various embodiments, the first portion 306 of the tab member 302 may be connected to the heat shield 304 using any suitable method, such as by welding (e.g., for metallic shields or polymeric shields) or by fasteners, including rivets or bolts 310 (e.g., for metallic or composite shields), extending through both the heat shield 304 and the first portion 306 of the tab member 302. In various embodiments, a second portion 312 of the tab member 302 extends radially inward from the first portion 306 toward a central axis of the wheel, such as the central axis 112 referred to in FIG. 1B. An aperture 314 may be positioned within the second portion 312 of the tab member 302 and extend therethrough to receive a pin 316 or similar feature of a torque bar 318. The pin 316 is sized and configured to be received by a hole in a wheel, such as the hole 222 disposed proximate the web portion 218 of the wheel 204 illustrated and referred to in FIGS. 2A and 2B. In various embodiments, the aperture 314 is positioned radially inward of the heat shield 304 a sufficient distance to provide a gap between the torque bar 318 and the heat shield 304.

Figure 3B:
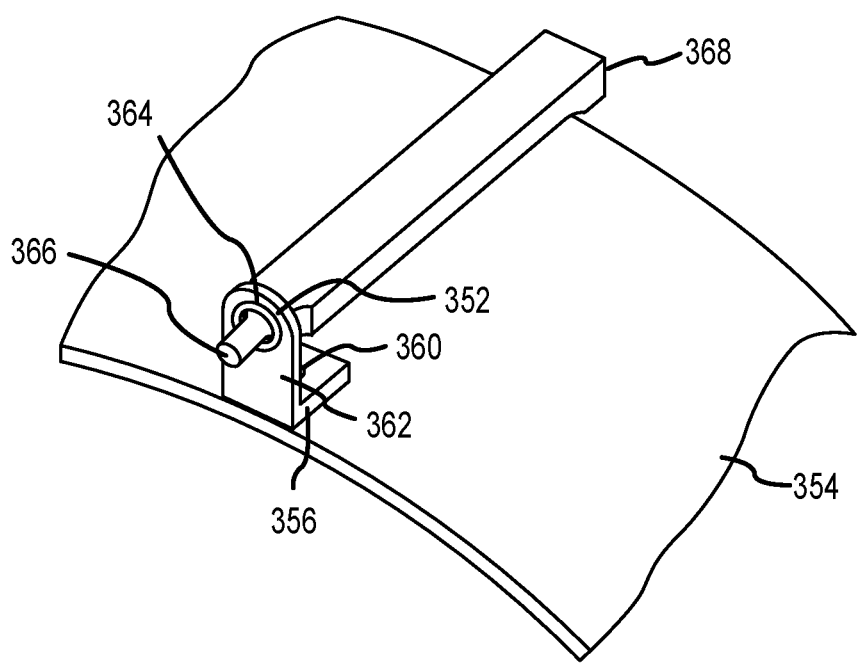

Referring to FIG. 3B, a tab member 352 is illustrated connected to a portion of a circumferential heat shield 354 in a manner similar to that described above with reference to FIG. 3B. In various embodiments, a first portion 356 of the tab member 352 may be formed integrally with the heat shield 354. In various embodiments, the first portion 356 of the tab member 352 may be connected to the heat shield 354 using any suitable method, such as by welding (e.g., for metallic shields or polymeric shields) or by rivets or bolts 360 (e.g., for metallic or composite shields) extending through both the heat shield 354 and the first portion 356 of the tab member 352. In various embodiments, a second portion 362 of the tab member 352 extends radially outward from the first portion 356 away from a central axis of the wheel, such as the central axis 112 referred to in FIG. 1B. An aperture 364 may be positioned within the second portion 362 of the tab member 352 and extend therethrough to receive a pin 366 or similar feature of a torque bar 368. The pin 366 is sized and configured to be received by a hole in a wheel, such as the hole 222 disposed proximate the web portion 218 of the wheel 204 illustrated and referred to in FIGS. 2A and 2B. In various embodiments, the aperture 364 is positioned radially outward of the heat shield 354 a sufficient distance to provide a gap between the torque bar 368 and the heat shield 354.

Figure 4:
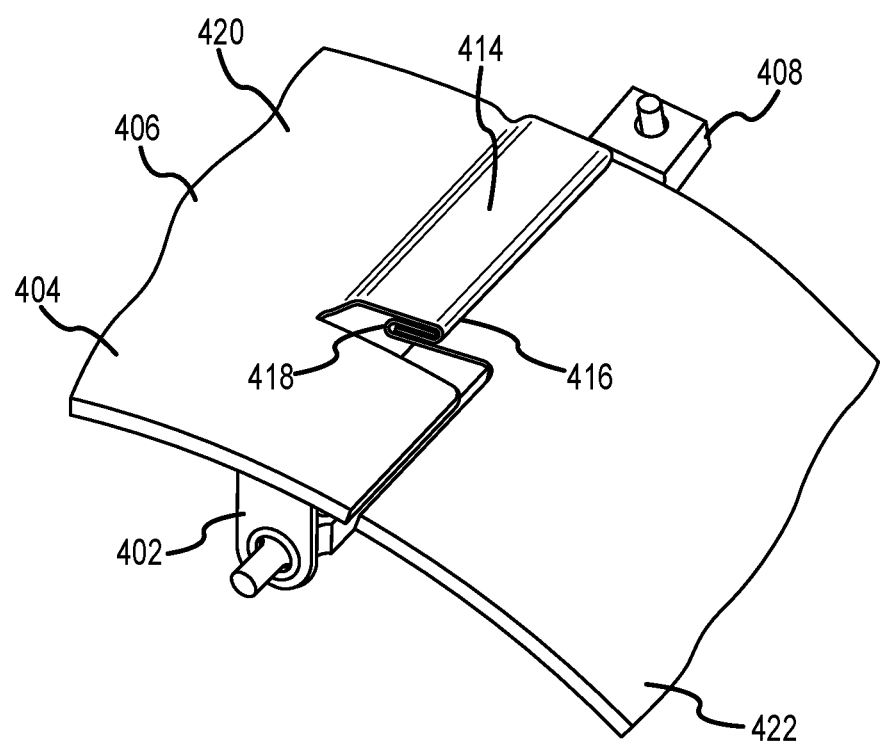
FIG. 4 illustrates a heat shield and mounting assembly, in accordance with various embodiments.

Referring now to FIG. 4, a tab member 402 is illustrated connected to a section 404 of a heat shield 406 that is comprised of one or more sections. In various embodiments, the tab member 402 shares one or more or all of the characteristics of the tab member 302 described above with respect to FIG. 3A. In various embodiments, the heat shield 406 comprises a plurality of heat shield sections 404 that may be disposed between respective pairs of torque bars 408. In various embodiments, each heat shield section 404 may provide for a connection joint 414, which may be formed by mating a first bend 416 included in a first heat shield section 420 with a second bend 418 included in an adjacent second heat shield section 422. The connection joint 414 formed by the intersection of adjacent heat shield sections may then be secured to a wheel, such as the wheel 204 referred to and illustrated in FIGS. 2A and 2B.

Figure 5A:
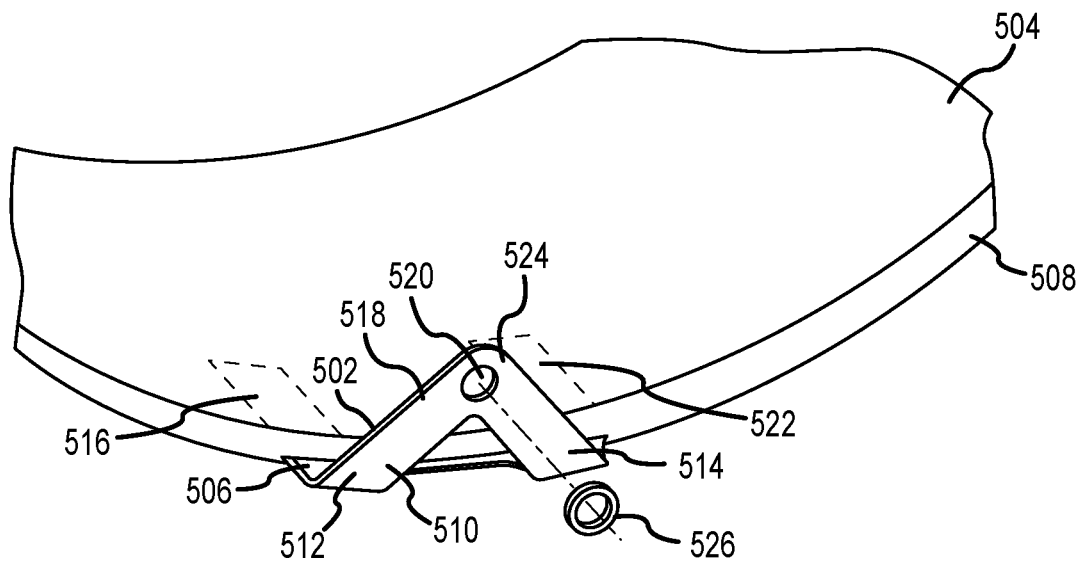
FIGS. 5A and 5B illustrate heat shield and mounting assemblies, in accordance with various embodiments.

Referring now to FIG. 5A, a tab member 502 is illustrated connected to a portion of a circumferential heat shield 504 according to various embodiments. In various embodiments, the tab member 502 includes a first arm 512 and a second arm 514. In various embodiments, the first arm 512 has a first end 516 connected to the heat shield 504 and a second end 518 extending radially inward of the heat shield 504 toward and terminating proximate an aperture 520. In various embodiments, the second arm 514 has a first end 522 connected to the heat shield 504 and a second end 524 extending radially inward of the heat shield 504 toward and terminating proximate the aperture 520. In various embodiments, an axially extending first portion 506 of the tab member 502 comprises the first end 516 of the first arm 512 and the first end 522 of the second arm 514 and is connected to an outboard or second end 508 of the heat shield 504. In various embodiments, a second portion 510 of the tab member 502 comprises the second end 518 of the first arm 512 and the second end 524 of the second arm 514 and extends radially inward of the first portion 506. In various embodiments, the aperture 520 is positioned radially inward of the heat shield 504 a sufficient distance to provide a gap between a torque bar and the heat shield 504. In various embodiments, the first portion 506 of the tab member 502, which may include both the first end 516 of the first arm 512 and the first end 522 of the second arm 514, may be formed integrally with the heat shield 504 or secured thereto using any suitable method, such as by welds or by fasteners, including rivets or bolts, as described above with reference to FIGS. 3A and 3B. In various embodiments, the first end 516 of the first arm 512 and the first end 522 of the second arm 514 may comprise separate material portions, as illustrated in FIG. 5A or a single portion of material, as described and illustrated below with reference to FIG. 6. In various embodiments, a grommet 526 is positioned about or within the aperture 520.

Figure 5B:
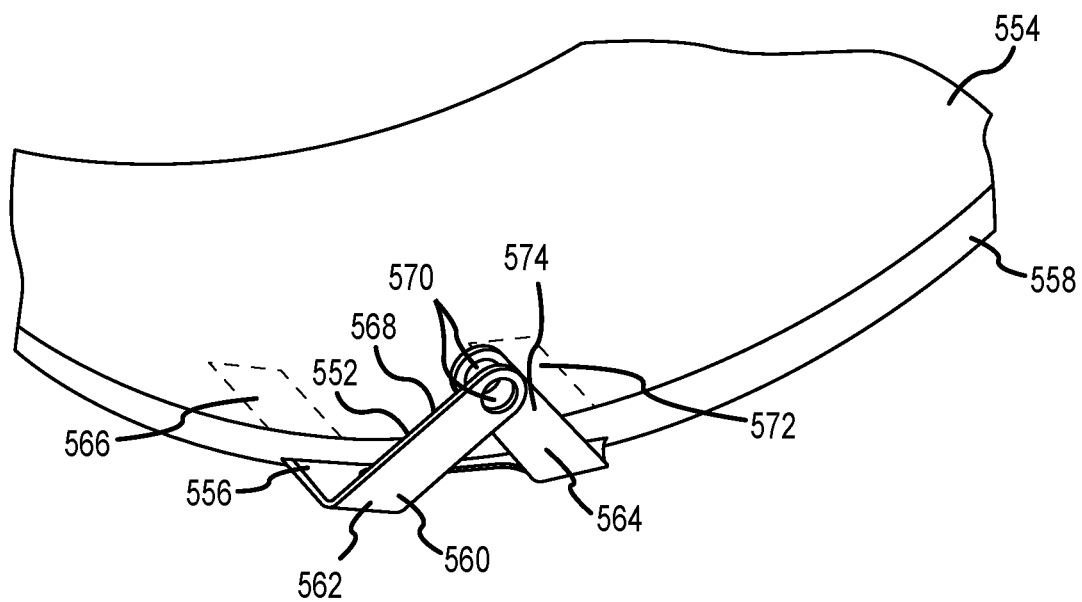

Referring now to FIG. 5B, a tab member 552, similar to the tab member 502 above described, is illustrated connected to a portion of a circumferential heat shield 554 according to various embodiments. In various embodiments, the tab member 552 includes a first arm 562 and a second arm 564. In various embodiments, the first arm 562 has a first end 566 connected to the heat shield 554 and a second end 568 extending radially inward of the heat shield 554 toward and terminating proximate an aperture 570. In various embodiments, the second arm 564 has a first end 572 connected to the heat shield 554 and a second end 574 extending radially inward of the heat shield 554 toward and terminating proximate the aperture 570. As illustrated, the first arm 562 and the second arm 564 are separate from one another—e.g., the arms do not form an integral unit proximate the aperture 570 but, instead, comprise two separate arms with two separate apertures that, together, centrally align (along each respective central axis) to form the aperture 570 proximate the second ends 568, 574. In various embodiments, an axially extending first portion 556 of the tab member 552 comprises the first end 566 of the first arm 562 and the first end 572 of the second arm 564 and is connected to an outboard or second end 558 of the heat shield 554. In various embodiments, a second portion 560 of the tab member 552 comprises the second end 568 of the first arm 562 and the second end 574 of the second arm 564 and extends radially inward of the first portion 556. The construction of the various components illustrated in FIG. 5B may incorporate the various techniques described above with reference to FIG. 5A.

Figure 6:
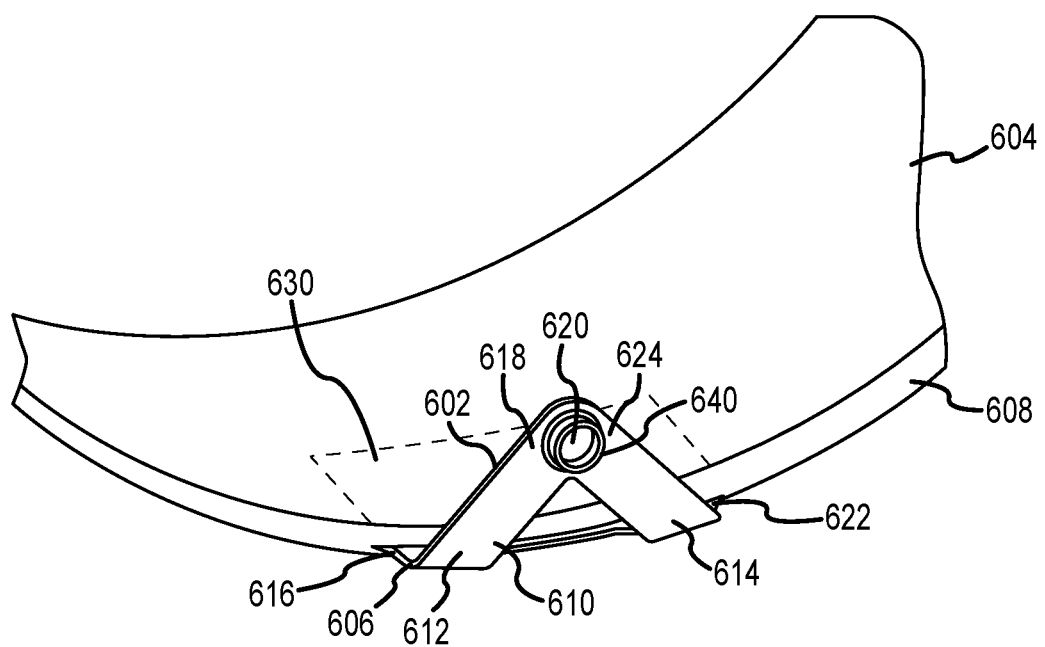
FIG. 6 illustrates a heat shield and mounting assembly, in accordance with various embodiments.

Referring now to FIG. 6, a tab member 602 is illustrated connected to a portion of a circumferential heat shield 604 according to various embodiments. In various embodiments, the tab member 602 includes a first arm 612 and a second arm 614. In various embodiments, the first arm 612 has a first end 616 connected to the heat shield 604 via a connection member 630 and a second end 618 extending radially inward of the heat shield 604 toward and terminating proximate an aperture 620. In various embodiments, the second arm 614 has a first end 622 connected to the heat shield 604 via the connection member 630 and a second end 624 extending radially inward of the heat shield 604 toward and terminating proximate the aperture 620. In various embodiments, an axially extending first portion 606 of the tab member 602 comprises the first end 616 of the first arm 612, the first end 622 of the second arm 614 and the connection member 630 and is connected to an outboard or second end 608 of the heat shield 604. In various embodiments, a second portion 610 of the tab member 602 comprises the second end 618 of the first arm 612 and the second end 624 of the second arm 614 and extends radially inward of the first portion 606. In various embodiments, the aperture 620 is positioned radially inward of the heat shield 604 a sufficient distance to provide a gap between a torque bar and the heat shield 604. In various embodiments, the aperture 620 includes an axially extending segment 640 sized and configured to be received by a hole in a wheel, such as the hole 222 disposed proximate the web portion 218 of the wheel 204 illustrated and referred to in FIGS. 2A and 2B. In various embodiments, the hole in the wheel may be staggered in diameter, such that a first portion of the hole is sized to receive the segment 640 and a second portion of the hole is sized to receive a pin or similar member of a torque bar. The segment 640 augments support of the tab member 602 and, thereby, the heat shield 604. In various embodiments, the connection member 630 of the tab member 602, which may connect to both the first end 616 of the first arm 612 and the first end 622 of the second arm 614 to form a single portion of material, may be formed integrally with the heat shield 604 or secured thereto using welds or rivets or bolts as described above with reference to FIGS. 3A and 3B. In various embodiments, a bushing or grommet may be incorporated within or about the aperture 620.

Figure 7A:
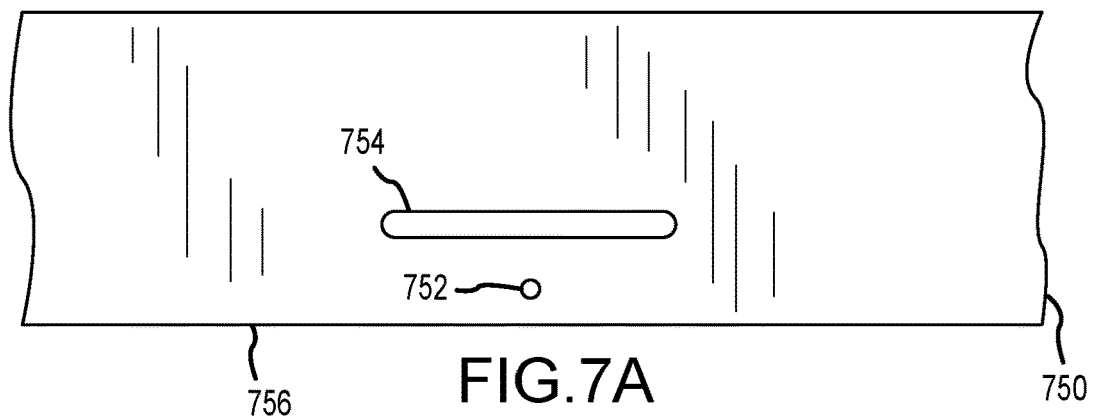
FIGS. 7A, 7B and 7C illustrate a heat shield and mounting assembly and a method of forming the same, in accordance with various embodiments.
Figure 7B:
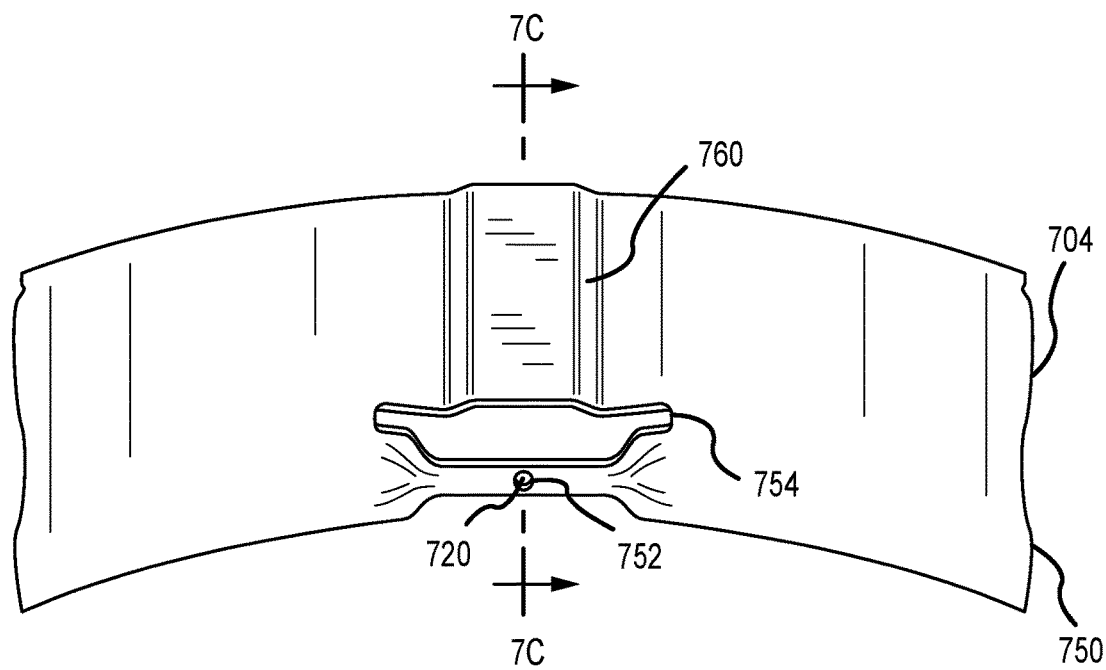
Figure 7C:
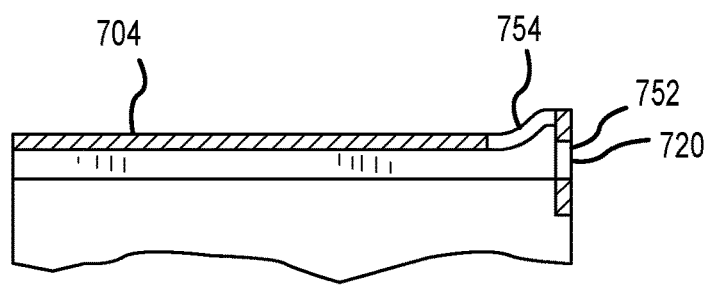

Referring now to FIGS. 7A, 7B and 7C, formation of a heat shield 704 is illustrated according to various embodiments. The formed heat shield 704 (or section of a heat shield) includes an aperture 720 configured to receive a pin or similar member of a torque bar for securing the heat shield against a wheel, as described above, and a raised section stamped or otherwise incorporated into the body of the heat shield 704. Referring to FIG. 7A, a blank of material 750 provides the first step of formation. The blank of material 750 is drilled or cut to include a first aperture 752 and a second aperture 754. The first aperture 752 is sized to receive a pin or similar member of a torque bar as described above. The second aperture 754 is sized and positioned to facilitate forming the blank of material 750 from a flat piece of material into a curved heat shield that is sized and configured for assemblage into a brake mechanism, such as the brake mechanism 100 illustrated in FIG. 1, including having space for a torque bar and aperture for receiving the pin or similar member of a torque bar.

Referring to FIGS. 7A, 7B and 7C, the blank of material 750 includes a first end 756 proximate the first aperture 752. In various embodiments of forming, the first end 756 is gripped and bent radially inward, so the first aperture 752 is oriented in an axial direction, or until the plane of material carrying the first aperture 752 is positioned roughly perpendicular to the blank of material 750. During the forming process, the second aperture 754 provides an area of stress relief, allowing the positioning of the first aperture 752 as just described without causing or allowing the blank of material 750 to suffer or experience the formation of surface kinks or ripples. The second aperture 754 also provides for the formation of a raised surface or portion 760 in the blank of material 750 that provides a space to accommodate the torque bar when assembled. Following the formation process described above, the resulting heat shield 704 includes the features of construction and use described above, in accordance with each of the various embodiments described above. Further, while these step are described with reference to a blank of sheet metal, the same ideas can be similarly incorporated into of performed with a composite material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield assembly, comprising:
a circumferential heat shield having a first end and a second end spaced from the first end along a central axis; and
a tab member disposed proximate the second end of the circumferential heat shield, the tab member having
a radially extending portion with an aperture extending therethrough and being configured for mounting the circumferential heat shield to a wheel,
an axially extending first portion connected to the second end of the circumferential heat shield, wherein the radially extending portion is a second portion extending radially inward from the first portion toward the central axis,
a plurality of arms forming the first portion and the second portion, the first portion including a first end of each arm connected to the circumferential heat shield and the second portion including a second end of each arm terminating proximate the aperture,
wherein the first arm and the second arm are non-integral, and the second end of each arm includes an individual aperture that centrally aligns to form the aperture of the tab member.

2. The heat shield assembly of claim 1, wherein the first portion of each of the tab members is formed integrally with the second end of the circumferential heat shield.

3. The heat shield assembly of claim 1, wherein the first portion of each of the tab members is connected to the second end of the circumferential heat shield by a weld.

4. The heat shield assembly of claim 1, wherein the first portion of each of the tab members is connected to the second end of the circumferential heat shield by a fastener.

* * * * *